(12) United States Patent
Suzuki et al.

(10) Patent No.: US 8,875,849 B2
(45) Date of Patent: Nov. 4, 2014

(54) CALIPER BRAKE DEVICE

(75) Inventors: Tsutomu Suzuki, Kawasaki (JP);
Yoshiyuki Ookawara, Sagamihara (JP);
Yasushi Karino, Fussa (JP)

(73) Assignees: Kayaba Industry Co., Ltd., Tokyo (JP);
Railway Technical Research Institute, Tokyo (JP)

( * ) Notice: Subject to any disclaimer, the term of this patent is extended or adjusted under 35 U.S.C. 154(b) by 452 days.

(21) Appl. No.: 13/129,621

(22) PCT Filed: Aug. 23, 2010

(86) PCT No.: PCT/JP2010/064656
§ 371 (c)(1),
(2), (4) Date: May 17, 2011

(87) PCT Pub. No.: WO2011/024980
PCT Pub. Date: Mar. 3, 2011

(65) Prior Publication Data
US 2011/0233009 A1     Sep. 29, 2011

(30) Foreign Application Priority Data

Aug. 25, 2009   (JP) ................. 2009-194524

(51) Int. Cl.
*F16D 55/18* (2006.01)
*F16D 65/18* (2006.01)
*F16D 65/54* (2006.01)
*F16D 55/00* (2006.01)
*F16D 121/02* (2012.01)
*F16D 125/12* (2012.01)

(52) U.S. Cl.
CPC .............. *F16D 65/18* (2013.01); *F16D 65/54* (2013.01); *F16D 2055/0091* (2013.01); *F16D 2121/02* (2013.01); *F16D 2125/12* (2013.01)
USPC ........................................ 188/72.4; 188/73.1

(58) Field of Classification Search
CPC ......... F16D 55/00; F16D 55/02; F16D 55/10; F16D 55/12; F16D 55/20; F16D 55/22
USPC .......... 188/72.4, 72.5, 370, 72.1, 73.31, 73.1, 188/73.32, 73.39
See application file for complete search history.

(56) References Cited

U.S. PATENT DOCUMENTS

| | | | | |
|---|---|---|---|---|
| 3,357,524 A | * | 12/1967 | Smith | .................. 188/73.32 |
| 3,526,171 A | * | 9/1970 | Barnes | .................. 92/98 D |
| 4,775,033 A | | 10/1988 | Heibel | |
| 4,867,280 A | * | 9/1989 | Von Gruenberg et al. ... 188/72.4 | |

FOREIGN PATENT DOCUMENTS

| | | |
|---|---|---|
| JP | 62-171531 A | 7/1987 |
| JP | 6-288417 A | 10/1994 |
| JP | 8-159184 A | 6/1996 |
| JP | 8-226469 A | 9/1996 |

(Continued)

*Primary Examiner* — Melanie Torres Williams
(74) *Attorney, Agent, or Firm* — Rabin & Berdo, P.C.

(57) ABSTRACT

In a vehicle caliper brake device, a brake pad supported by a holder applies a frictional force to a braking surface as a diaphragm actuator is driven. The holder is supported by a caliper main body to be capable of displacing in a displacement direction of the brake pad. The diaphragm actuator includes a piston that is driven by a diaphragm to push the holder. The piston is fixed to the holder using a plurality of screws, and therefore the piston applies a pressing force to the brake pad uniformly without the need for guidance by a guide.

9 Claims, 4 Drawing Sheets

(56) References Cited

FOREIGN PATENT DOCUMENTS

| | | |
|---|---|---|
| JP | 8-226471 A | 9/1996 |
| JP | 11-230212 A | 8/1999 |
| JP | 2004-132545 A | 4/2004 |
| JP | 2009-115215 A | 5/2009 |
| JP | 2009-162245 A | 7/2009 |
| WO | WO-03/048598 A1 | 6/2003 |
| WO | WO-2009/048171 A1 | 4/2009 |
| WO | WO-2009/060993 A1 | 5/2009 |

* cited by examiner

CALIPER BRAKE DEVICE

FIELD OF THE INVENTION

This invention relates to a caliper brake device which applies a frictional force to a braking surface that rotates integrally with a vehicle wheel.

BACKGROUND OF THE INVENTION

A railway vehicle is typically installed with a pneumatic-hydraulic converter that converts an air pressure supplied from an air pressure source into an oil pressure, whereby a hydraulic brake is activated using the oil pressure supplied from the pneumatic-hydraulic converter via an oil pressure pipe.

With regard to this point, JPH08-226469A and JPH08-226471A, published by the Japan Patent Office in 1996, disclose a hydraulic brake device for a railway vehicle in which a hydraulic cylinder presses a brake pad against a friction surface of a rotary body such as a brake rotor in accordance with a supplied oil pressure.

By installing a pneumatic brake that is activated by an air pressure supplied from an air pressure source in the railway vehicle, on the other hand, it is possible to omit the pneumatic-hydraulic converter and the oil pressure pipe.

With regard to this possibility, JP2009-162245A, published by the Japan Patent Office in 2009, discloses a pneumatic caliper brake device employing a pneumatic actuator. The pneumatic caliper brake device uses the pneumatic actuator to press a brake pad against a friction surface of a rotary body. Compressed air is supplied to an air chamber of the pneumatic actuator from an air pressure source.

SUMMARY OF THE INVENTION

In the hydraulic brake device according to JPH08-226469A and JPH08-226471A, the hydraulic cylinder presses a part of the brake pad instead of pressing the entire brake pad. As a result, a reaction force against the pressing force may cause the brake pad to deflect and the friction surface to deform. Further, a local temperature increase may occur on the brake pad, leading to a reduction in a frictional coefficient of the brake pad, and as a result, the brake pad may be unable to exhibit an expected braking force. Moreover, the brake pad is likely to suffer from partial wear.

The pneumatic caliper brake device according to JP2009-162245A includes a guide that slides along an outer periphery of a piston to cause the piston to displace along a central axis. However, when a frictional force generated between the braking surface and the brake pad causes the piston to tilt, a large force is exerted on a sliding portion between the piston and the guide, leading to an increase in a sliding resistance of the piston relative to the guide. As a result, a reduction is likely to occur in the efficiency with which an air pressure from a driving pressure chamber is converted into a pressing force for pressing the brake pad.

It is therefore an object of this invention to increase the efficiency with which a fluid pressure is converted into a pressing force for pressing a brake pad and to secure a stable braking force.

In order to achieve this object, this invention provides a vehicle caliper brake device which is installed in a vehicle that includes a vehicle body and a vehicle wheel having a braking surface to exert a braking force on the vehicle wheel. The device comprises a brake pad that exerts a frictional force on the braking surface, a holder that supports the brake pad, a caliper main body supported by the vehicle body, a pair of anchor pins that supports the holder on the caliper main body to be capable of advancing and retreating relative to the braking surface, and an actuator that presses the brake pad against the braking surface via the holder. The actuator comprises: a diaphragm accommodated in the caliper main body, a driving pressure chamber defined by the diaphragm on an inner side of the caliper main body, a piston that transmits a displacement of the diaphragm to the holder, and a joining mechanism including a plurality of screws for fixing the piston to the holder.

The details as well as other features and advantages of this invention are set forth in the remainder of the specification and are shown in the accompanying drawings.

DESCRIPTION OF THE PREFERRED EMBODIMENTS

Figure 2:
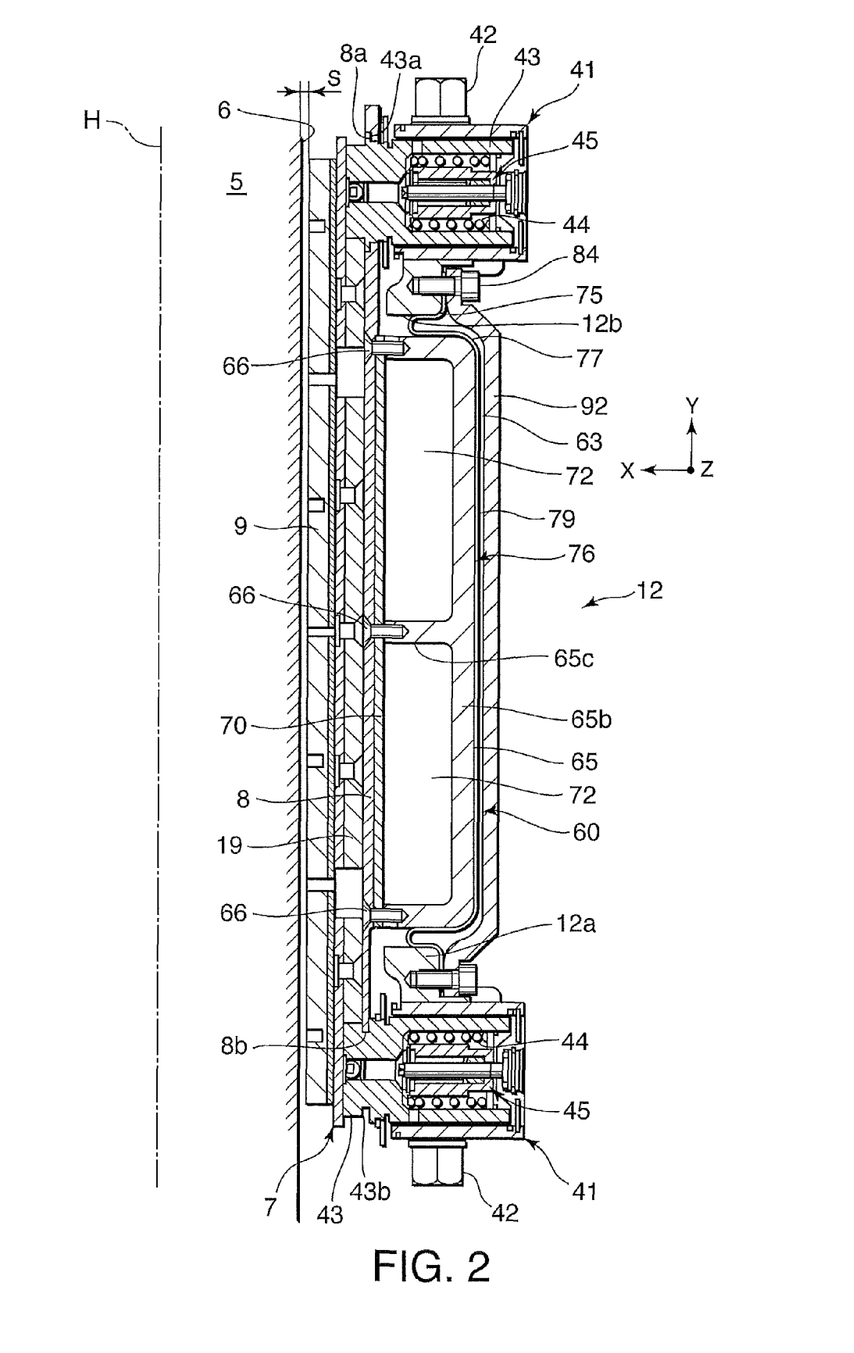
FIG. 2 is a longitudinal sectional view of the caliper brake device, taken along a II-II line in FIG. 1.

Referring to FIG. 2 of the figures, in a caliper brake device for a railway vehicle, braking surfaces 6 formed on respective side faces of a vehicle wheel 5 are sandwiched between a pair of brake pads 7 in order to apply a brake to rotation of the vehicle wheel 5. An X axis, a Y axis, and a Z axis in the figure correspond to an axle direction of the vehicle wheel 5, a vertical direction, and a front-rear direction, respectively. A dot-dash line H in the figure denotes a central axis of the vehicle wheel 5.

Figure 1:
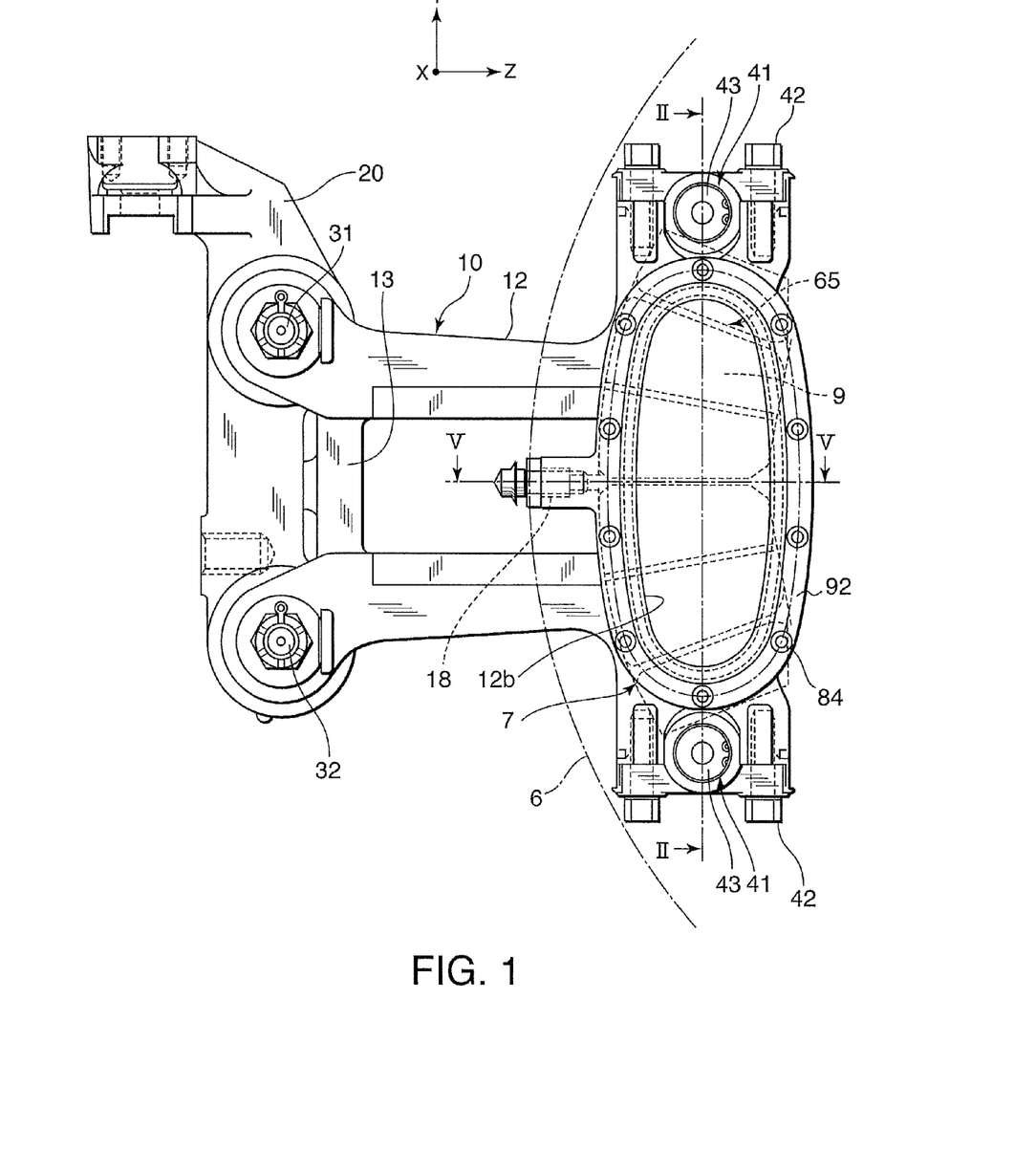
FIG. 1 is a side view of a caliper brake device according to this invention.

Referring to FIG. 1, a caliper main body 10 of the caliper brake device is supported by a support frame 20 fixed to a vehicle body of the railway vehicle to be capable of sliding in the X axis direction of the figure via slide pins 31 and 32. Here, the vehicle body includes a bogie.

A floating support structure for the caliper main body 10 is a well-known structure disclosed in WO2009/048161 and WO2009/060993, the contents of which are incorporated herein by reference.

The caliper main body 10 includes a pair of caliper arms 12 opposing the braking surfaces 6 on the respective side faces of the vehicle wheel 5, and a yoke portion 13 linking the caliper arms 12.

Referring back to FIG. 2, a brake pad 7, a holder 8, and a diaphragm actuator 60 that drives the brake pad 7 toward one of the braking surfaces 6 via the holder 8 are built into the caliper arms 12. A brake pad 7 is supported fixedly on the other caliper arms 12 so as to be oriented toward the other braking surface 6.

The brake pad 7 that is driven by the diaphragm actuator 60 will now be described.

The brake pad 7 includes a lining 9 constituted by a frictional material that contacts the braking surface 6 of the vehicle wheel 5. The lining 9 is substantially arc-shaped, as shown by a broken line in FIG. 1. A back surface of the lining 9 is fixed to a metal lining back plate 19. The lining back plate 19 is joined to the holder 8 by a dovetail joint.

Figure 5:
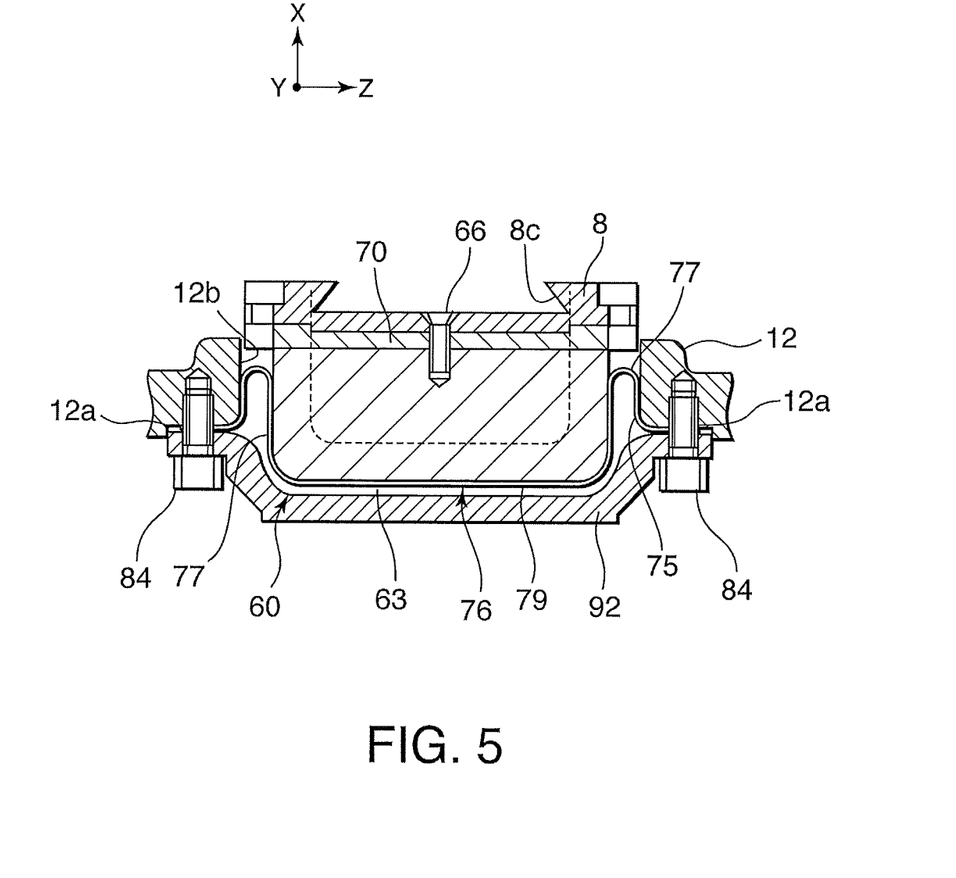
FIG. 5 is a cross-sectional view of the caliper brake device, taken along a V-V line in FIG. 1.

Referring to FIG. 5, a dovetail groove 8c is formed in the holder 8 for this purpose. A projection that has an identically shaped cross-section to the dovetail groove 8c and therefore fits into the dovetail groove 8c is formed on a back surface of the lining back plate 19.

Figure 4:
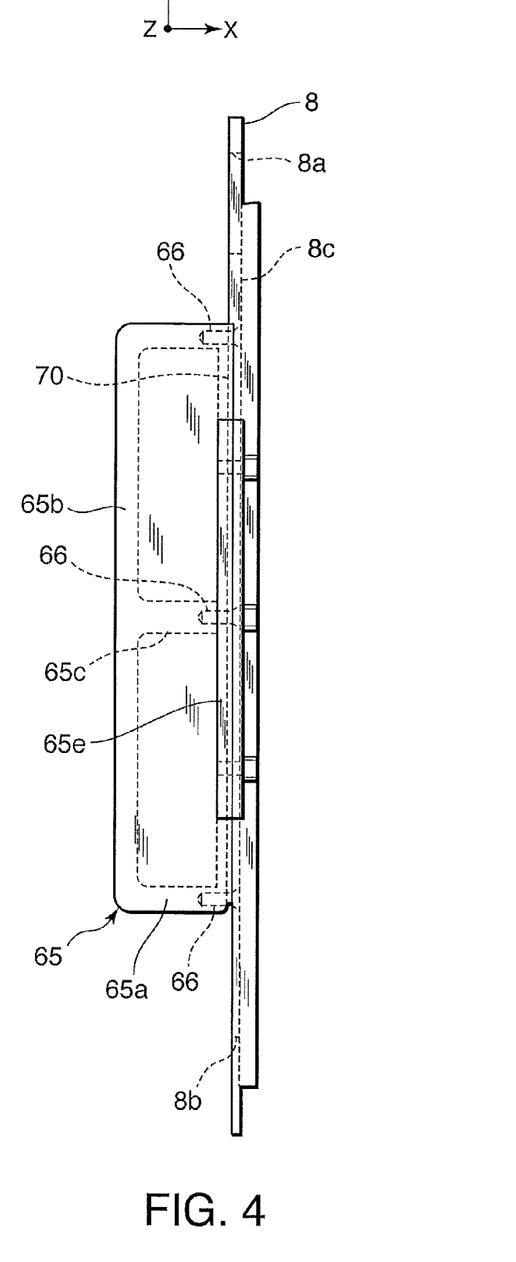
FIG. 4 is a side view of the piston and the holder.

Referring to FIG. 4, the lining back plate 19 is joined to the holder 8 by inserting the projection on the back surface thereof into the dovetail groove 8c from an upper end or a lower end of the figure.

Referring back to FIG. 2, the brake pad 7 is supported on the caliper arms 12 via the holder 8 and an adjuster 41. For this purpose, the adjuster 41 is fixed to an upper end of one caliper arm 12 and a lower end of the other caliper arm 12 by anchor bolts 42.

The adjuster 41 includes a return spring 44 that biases the brake pad 7 in a direction heading away from the braking surface 6 via the holder 8, and a gap adjustment mechanism 45 that adjusts a gap between the brake pad 7 and the braking surface 6 to be substantially constant in a state where a force other than a biasing force of the return spring 44 is not exerted on the brake pad 7. When the brake is released, the brake pad 7 is separated from the braking surface 6 by the return spring 44 so as to oppose the braking surface 6 via a gap S defined by the gap adjustment mechanism 45.

The adjuster 41 includes a cylindrical anchor pin 43 projecting in the X axis direction. A tip end of the anchor pin 43 is joined to an end portion of the holder 8.

Figure 3:
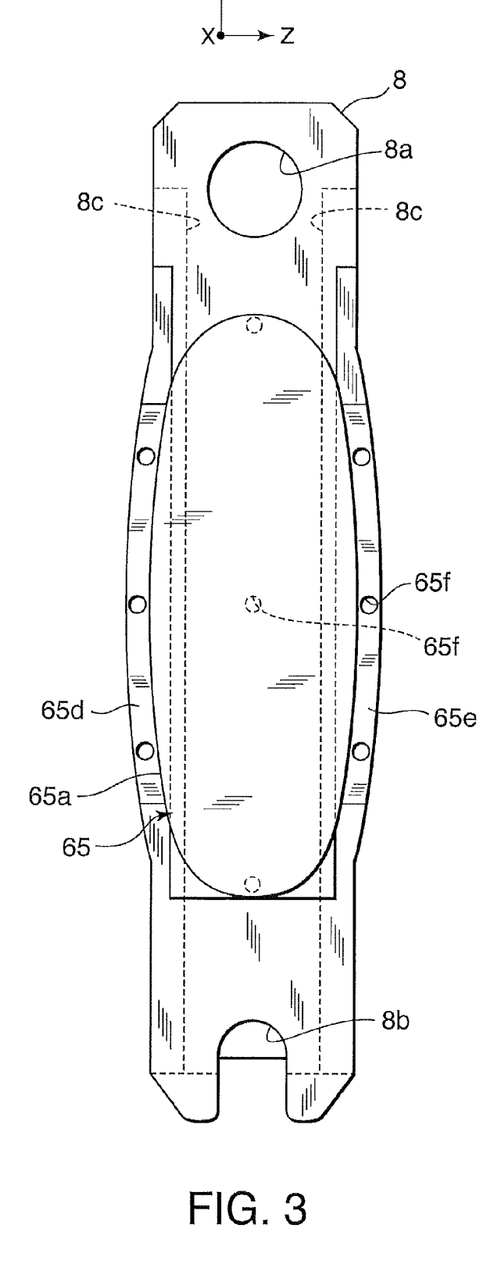
FIG. 3 is a plan view of a piston and a holder according to this invention.

Referring to FIGS. 3 and 4, an engagement hole 8a is formed in an upper end of the holder 8.

Referring back to FIG. 2, an enlarged diameter portion 43a is formed on a tip end of the anchor pin 43 disposed on the upper end of the one caliper arm 12. The adjuster 41 on the upper end of the one caliper arm 12 is caused to support the upper end of the holder 8 by inserting the anchor pin 43 into the engagement hole 8a and bringing the enlarged diameter portion 43a into contact with a peripheral edge portion of the engagement hole 8a.

Referring back to FIGS. 3 and 4, a cutout 8b is formed in a lower end of the holder 8.

Referring back to FIG. 2, an annular engagement groove 43b is formed in the tip end of the anchor pin 43 of the adjuster 41 disposed on the lower end of the other caliper arm 12. The adjuster 41 fixed to the lower end of the other caliper arm 12 is caused to support the lower end of the holder 8 by engaging the engagement groove 43b with a peripheral edge portion of the cutout 8b in the lower end of the holder 8.

When the brake pad 7 is attached to the caliper arms 12, the projection on the lining back plate 19 of the brake pad 7 is inserted into the dovetail groove 8c of the holder 8 from below in a state where the adjuster 41 and the anchor pin 43 are detached from the lower end of the other caliper arm 12. When the projection has reached a predetermined position of the holder 8, the adjuster 41 and the anchor pin 43 are fixed to the lower end of the other caliper arm 12 by the anchor bolt 42. As a result, the upper end and the lower end of the holder 8 are fitted into the engagement grooves 43b of the respective anchor pins 43, thereby restricting displacement of the brake pad 7 in the Y axis direction.

The tip ends of the respective anchor pins 43 contact an upper end portion and a lower end portion of the lining back plate 19 of the brake pad 7. The tip ends of the anchor pins 43 support a braking reaction force received by the brake pad 7 from the braking surface 6.

The adjuster 41 is a universally known mechanism disclosed in JPH06-288417A, published by the Japan Patent Office in 1994, the contents of which are incorporated herein by reference.

By means of the support structure described above, the brake pad 7 is supported by the caliper arms 12 so as to be capable of displacing in the X axis direction while remaining parallel to the braking surface 6.

The adjuster 41 includes a rubber boot that covers an exposed portion of the anchor pin 43 in order to protect the anchor pin 43 from dust.

After becoming worn, the lining 9 is replaced by replacing the entire brake pad 7, including the lining back plate 19, in a following process.

The anchor bolt 42 on the lower end of the other caliper arm 12 is removed, whereupon the adjuster 41 on the lower end of the other caliper arm 12 is detached downward from the cutout 8b while sliding the engagement groove 43b of the anchor pin 43 downward relative to the peripheral edge portion of the cutout 8b. Next, the projection on the lining back plate 19 is caused to slide downward along the dovetail groove 8c of the holder 8 such that the brake pad 7 is detached from the holder 8.

Next, the projection on the lining back plate 19 of the new brake pad 7 is inserted into the dovetail groove 8c of the holder 8. The holder 8 is then caused to slide upward until the upper end of the lining back plate 19 contacts the anchor pin 43 of the adjuster 41 on the upper end of the one caliper arm 12. In this state, the adjuster 41 detached from the lower end of the other caliper arm 12 is fixed to the other caliper arm 12 using the anchor bolt 42.

In FIG. 2, another pair of caliper arms 12 is positioned on the left side of the dot-dash line H in the figure. A support rail is formed integrally with these caliper arms 12. The lining back plate 19 of the brake pad 7 is fitted into a dovetail groove formed in the support rail. An anchor block is fixed to the upper end and the lower end of these caliper arms 12 to retain the brake pad.

As described above, the diaphragm actuator 60 for pushing the brake pad 7 toward the braking surface 6 via the holder 8 is provided in the first pair of caliper arms 12.

Referring back to FIG. 1, the diaphragm actuator 60 is disposed on an inner side of an accommodating wall 12b formed between the upper and lower adjusters 41 fixed to the caliper arms 12. The accommodating wall 12b is formed with a substantially elliptical cross-section that opposes a wide range of the lining 9. The cross-sectional shape of the accommodating wall 12b is not limited to a substantially elliptical shape, however, and may take a substantially identical arc shape to the outer shape of the lining 9.

Referring back to FIG. 2, the diaphragm actuator 60 includes a diaphragm 76, a cover 92, a driving pressure chamber 63, and a piston 65. An annular attachment seat 12a having a plurality of screw holes formed at predetermined intervals is formed on a periphery of the accommodating wall 12b of the caliper arms 12. The cover 92 is fixed to the caliper arms 12 by screws 84 screwed into the respective screw holes. A peripheral edge portion 75 of the diaphragm 76 is sandwiched between the attachment seat 12a and the cover 92.

The driving pressure chamber 63 is defined by the accommodating wall 12b, the diaphragm 76, and the cover 92. The piston 65 is interposed between the diaphragm 76 and the holder 8. The diaphragm actuator 60 presses the brake pad 7 joined to the holder 8 against the braking surface 6 by causing the diaphragm 76 to push the holder 8 in the X axis direction of the figure in accordance with an air pressure supplied to the driving pressure chamber 63 from an air pressure source installed in the railway vehicle.

The cover 92, similarly to the attachment seat 12a, has a substantially elliptical shape. The cover 92 is constituted by a plate-shaped member that projects outward in a site facing the driving pressure chamber 63.

The diaphragm 76 is formed from a resin elastic material. The diaphragm 76 may be formed in a bellows shape using a resin elastic material including a reinforcing material such as carbon fiber or Kevlar® fiber. The diaphragm 76 may also be formed from a bellows made of thin metal plate or a rubber tube.

The diaphragm 76 is constituted by the peripheral edge portion 75, a bend portion 77 that extends toward the holder 8 along the accommodating wall 12b from the peripheral edge portion 75 and then bends inward by approximately 180 degrees, and a piston pushing portion 79 that forms a parallel plane to the movable brake pad 7 on an inner side of the bend portion 77.

The piston 65 is disposed between the piston pushing portion 79 and the holder 8 of the brake pad 7.

Referring back to FIGS. 3 and 4, the piston 65 is a hollow cylindrical member including an elliptical tube portion 65a extending in the X axis direction, a crown plate portion 65b that extends in the Y axis direction and the X axis direction so as to close a tip end of the elliptical tube portion 65a, a partition wall portion 65c that extends in the X axis direction and the Z axis direction so as to partition the inside of the elliptical tube portion 65a, a front flange 65d projecting frontward from a base end of the elliptical tube portion 65a, and a rear flange 65e projecting rearward from the base end of the elliptical tube portion 65a. The elliptical tube portion 65a is substantially parallel to the accommodating wall 12b of the caliper arms 12. The partition wall portion 65c increases a rigidity of the piston 65. The front flange 65d and the rear flange 65e are provided to fix the piston 65 to the holder 8.

Referring back to FIG. 2, a space having an annular cross-section in the X axis direction is formed between the accommodating wall 12b and a side face of the piston 65. The bend portion 77 of the diaphragm 76 is accommodated in this space. The bend portion 77 is bent by approximately 180 degrees inside the space so as to expand and contract in accordance with displacement of the piston 65 in the X axis direction. The bend portion 77 is preferably disposed on the inner side of the accommodating wall 12b to restrict expansion of the diaphragm 76 in the Y axis or Z axis direction.

The piston pushing portion 79 of the diaphragm 76 contacts an entire surface of the crown plate portion 65b such that the crown plate portion 65b is pushed by an air pressure led to the driving pressure chamber 63. The piston pushing portion 79 may be attached fixedly to the crown plate portion 65b by adhesion, fastening, and so on.

An insulating panel 70 is sandwiched between the piston 65 and the holder 8. The insulating panel 70 is formed in a plate shape using a thermal insulation material, and serves to suppress heat transfer from the brake pad 7 to the piston 65 and the diaphragm 76. By providing the insulating panel 70, heat transfer to the diaphragm 76 can be blocked sufficiently even when the piston 65 is formed from a metal having high thermal conductivity, for example.

An insulation space 72 sealed by the insulating panel 70 is provided on the inside of the piston 65. The insulation space 72 serves together with the insulating panel 70 to block heat transfer from the brake pad 7 to the diaphragm 76.

Referring back to FIG. 3, the piston 65 is fastened to the holder 8 by a plurality of screws 66 penetrating the insulating panel 70. For this purpose, a plurality of through holes are formed in respective peripheral edge portions of the holder 8 and the insulating panel 70. Further, screw holes 65f are formed in the front flange 65d and the rear flange 65e of the piston 65. The screws 66 are inserted into the through holes in the holder 8 and the insulating panel 70 and fastened to the screw holes 65f in the front flange 65d and rear flange 65e. Furthermore, similar screw holes 65f are formed in an upper end and a lower end of the elliptical tube portion 65a and a center of the partition wall portion 65c of the piston 65, and the screws 66 penetrating the holder 8 and the insulating panel 70 in corresponding positions are fastened to these screw holes 65f. By providing the piston 65 with the flanges 65d, 65e, a number of joining points between the piston 65 and the holder 8 can be increased, and as a result, the piston 65 can be fixed to the holder 8 reliably.

The screws 66, the through holes in the holder 8 and the insulating panel 70, and the screw holes 65f formed in the piston 65 together constitute joining means for joining the piston 65 to the holder 8.

Referring back to FIG. 1, an inlet 18 that communicates with the driving pressure chamber 63 is provided in the caliper arms 12. The inlet 18 functions as an air inlet/outlet that introduces compressed air from the air pressure source installed in the railway vehicle into the driving pressure chamber 63 or opens the driving pressure chamber 63 to the atmosphere.

Operations to introduce air into the driving pressure chamber 63 via the inlet 18 and open the driving pressure chamber 63 to the atmosphere via the inlet 18 are performed by a controller and a switch valve, not shown in the figures.

During braking, the diaphragm 76 is expanded by the compressed air led into the driving pressure chamber 63 such that the piston pushing portion 79 of the diaphragm 76 presses the brake pad 7 against the braking surface 6 via the piston 65. The brake pad 7 pressed against the braking surface 6 applies a brake to the rotation of the vehicle wheel 5 by exerting a frictional force on the braking surface 6. The piston pushing portion 79 of the diaphragm 76 contacts the entire surface of the crown plate portion 65b of the piston 65, and therefore the diaphragm 76 exerts an even pressure on the piston 65. As a result, the brake pad 7 likewise applies an even braking pressure to the braking surface 6 via the holder 8.

When the driving pressure chamber 63 is opened to the atmosphere, on the other hand, the diaphragm 76 contracts such that the brake pad 7 is separated from the braking surface 6 by a spring force of the return spring 44 provided in the adjuster 41.

According to this caliper brake device, therefore, deflection of the brake pad 7, deformation of the friction surface of the lining 9, and local temperature increases on the lining 9 are less likely to occur than in JPH08-226469A and JPH08-226471A of the prior art, and therefore a stable braking operation is realized. Furthermore, the lining 9 is unlikely to suffer from partial wear.

Moreover, in this caliper brake device, the piston 65 is fastened to the holder 8 by the plurality of screws 66. The holder 8 is supported by the anchor pins 43, which are supported by the upper and lower adjusters 41, and therefore displacement of the holder 8 in the X axis direction of FIG. 2 is guided by the adjusters 41. In other words, displacement of the holder 8 in the Y axis direction and the Z axis direction is restricted by the adjusters 41.

Accordingly, displacement of the piston 65 fixed to the holder 8 is limited to the X axis direction by the plurality of screws 66, and thereby restricted in the Y axis direction and Z axis direction.

With the constitution described above, a guide for restricting displacement of the piston 65 in the Y axis direction and the Z axis direction, such as that required in JP2009-162245A of the prior art, is not necessary, and therefore sliding resistance generated by the guide is eliminated. As a result, the air pressure of the driving pressure chamber 63 can be transmitted after being converted into a pressing force for pressing the brake pad 7 with a high degree of efficiency. By omitting the guide, a reduction can be achieved in the size of the diaphragm actuator 60.

The adjuster 41 keeps the gap S constant during non-braking relative to the progression of wear on the lining 9. Accordingly, a stroke distance of the piston 65 required to apply a brake is kept constant at all times, and therefore a stable braking operation is realized.

Further, by interposing the piston 65 between the diaphragm 76 and the brake pad 7, a disposed freedom of the piston 65 can be improved.

Moreover, in this caliper brake device, the diaphragm actuator 60 is activated using air pressure, thereby eliminating the need to install a pneumatic-hydraulic converter or an oil pressure source and an oil pressure pipe in the railway vehicle. As a result, a reduction can be achieved in the weight of the railway vehicle.

The contents of Tokugan 2009-194524, with a filing date of Aug. 25, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, the caliper brake device uses the diaphragm actuator 60 activated by air pressure, but this invention may also be applied to a caliper brake device employing a diaphragm actuator that is activated by oil pressure. Likewise in this case, the piston has a larger pressure-receiving surface area than that of a conventional hydraulic piston type caliper brake device, and therefore a required pressing force can be secured in the actuator using a low oil pressure. As a result, boosting by a pneumatic-hydraulic converter is not required, and therefore a reduction can be achieved in the size of the pneumatic-hydraulic converter.

In this caliper brake device, the brake pad 7 is pressed by the single piston 65. However, the piston 65 may be divided into a plurality of pistons. In this case, even when the caliper main body is deflected or the braking surface is deformed by a reaction force exerted on the pistons by the brake pad, the respective pistons are capable of operating in response to the deflection and deformation, and therefore a surface pressure applied to the braking surface by the brake pad can be kept uniform.

If necessary, a plate sprayed with a thermal insulation material may be used as the insulating panel 70. The insulating panel 70 may be disposed between the crown plate portion 65b and the piston pushing portion 79.

Further, the insulating panel 70 may be interposed between the crown plate portion 65b of the piston 65 and the piston pushing portion 79 of the diaphragm 76. In this case also, heat transfer to the diaphragm 76 constituted by a resin elastic material can be blocked.

In this caliper brake device, the diaphragm actuator 60 is provided on only one of the pairs of caliper arms 12, but this invention may also be applied to a caliper brake device in which the diaphragm actuator 60 is provided on both of the pairs of caliper arms 12.

INDUSTRIAL APPLICABILITY

As described above, with the caliper brake device according to this invention, the efficiency with which a liquid pressure is converted into a pressing force for pressing a brake pad can be increased, and therefore a stable braking force can be obtained. Hence, by applying this invention to a brake device for a railway vehicle, a pneumatic-hydraulic converter installed in the railway vehicle can be omitted or reduced in size.

The invention claimed is:

1. A vehicle caliper brake device which is installed in a vehicle that includes a vehicle body and a vehicle wheel having a braking surface to exert a braking force on the vehicle wheel, comprising:
    a brake pad that exerts a frictional force on the braking surface;
    a holder that supports the brake pad;
    a caliper main body supported by the vehicle body;
    a pair of anchor pins joined to the holder; and
    a pair of adjusters that support the pair of anchor pins respectively such that the holder is capable of advancing and retreating relative to the braking surface; and
    an actuator that presses the brake pad against the braking surface via the holder,
    wherein the actuator comprises:
        a diaphragm accommodated in the caliper main body;
        a driving pressure chamber defined by the diaphragm on an inner side of the caliper main body;
        a piston that transmits a displacement of the diaphragm to the holder; and
        a joining mechanism including a plurality of screws for fixing the piston to the holder,
    wherein the piston is a hollow cylindrical member comprising an elliptical tube portion having an elliptical cross-section, a crown plate portion that closes a tip end of the elliptical tube portion, and a partition wall portion that partitions an inside of the elliptical tube portion,
    an insulation space that blocks heat transfer from the holder to the piston is provided on an inner side of the piston, and
    the joining mechanism further includes a plurality of screw holes formed in the piston, the screws being inserted through the holder and screwed into the screw holes, wherein the piston comprises a flange that projects sideward from a base end of the elliptical tube portion, and the screw holes include screw holes formed in the flange.

2. The vehicle caliper brake device as defined in claim 1, wherein the pair of anchor pins is provided on the caliper main body for supporting respective end portions of the holder, and the driving pressure chamber is disposed between the pair of anchor pins.

3. The vehicle caliper brake device as defined in claim 1, wherein the diaphragm comprises a bend portion that expands and contracts between the caliper main body and the piston, and the caliper main body comprises a cylindrical accommodating wall surrounding the bend portion.

4. The vehicle caliper brake device as defined in claim 1, further comprising an insulating panel interposed between the piston and the holder.

5. The vehicle caliper brake device as defined in claim 1, wherein
    the vehicle wheel comprises the braking surface on both side faces thereof,
    the caliper main body includes a pair of caliper arms each of which opposes the braking surface of each of the side faces,
    one of the pair of caliper arms comprises the pair of anchor pins, the brake pad supported by the pair of anchor pins via the holder, and the actuator that presses that brake pad against the braking surface via the holder, and
another brake pad is fixed to the other caliper arm via another holder.

6. The vehicle caliper brake device as defined in claim 5, further comprising a slide pin that supports the caliper main body to be capable of displacing relative to the vehicle body in an axial direction of the vehicle wheel.

7. The vehicle caliper brake device as defined in claim 1, wherein each of the screws fixes the piston to the holder by touching each of the piston and the holder.

8. The vehicle caliper brake device as defined in claim 1, wherein each of the screws penetrates each of the piston and the holder.

9. The vehicle caliper brake device as defined in claim 1, wherein
the vehicle wheel comprises the braking surface on both side faces thereof,
the caliper main body includes a pair of caliper arms which opposes each of the braking surfaces,
one of the pair of caliper arms includes said pair of anchor pins, said brake pad, and said actuator, and
another brake pad is fixed to the other caliper arm via another holder.

* * * * *